(12) United States Patent
Liu et al.

(10) Patent No.: US 6,397,700 B1
(45) Date of Patent: Jun. 4, 2002

(54) DUAL DIAL ROD SPEED CHANGING INDICATOR

(75) Inventors: Wen-Ching Liu; Yu-Chen Chen, both of Taichung Hsien (TW)

(73) Assignee: Falcon Industrial Co., Ltd., Taichung Hsien (TW)

( * ) Notice: Subject to any disclaimer, the term of this patent is extended or adjusted under 35 U.S.C. 154(b) by 67 days.

(21) Appl. No.: 09/664,005

(22) Filed: Sep. 18, 2000

(51) Int. Cl.[7] ............................................. F16C 1/10
(52) U.S. Cl. ...................................................... 74/502.2
(58) Field of Search ............................ 74/484 R, 489, 74/473.3, 473.1, 479.01, 502.2

(56) References Cited

U.S. PATENT DOCUMENTS

| | | | | |
|---|---|---|---|---|
| 5,012,692 A | * | 5/1991 | Nagano | 74/475 |
| 5,213,005 A | * | 5/1993 | Nagano | 74/502.2 |
| 5,673,594 A | * | 10/1997 | Huang et al. | 74/475 |
| 5,732,593 A | * | 3/1998 | Hwang et al. | 74/142 |
| 5,768,945 A | * | 6/1998 | Ose | 74/489 |
| 6,220,111 B1 | * | 4/2001 | Chen | 74/473.15 |

* cited by examiner

*Primary Examiner*—David A. Bucci
*Assistant Examiner*—Timothy McAnulty
(74) *Attorney, Agent, or Firm*—Browdy and Neimark

(57) ABSTRACT

A dual dial rod speed changing indicator comprises a base board, a wire hub seat, an advancing member, and a withdrawing member. The wire hub seat is acted on by a bias force and pivoted to the base board. The wire hub seat has a first ratchet tooth portion and a second ratchet tooth portion. The advancing member comprises an advancing dial rod and an advancing ratchet pawl pivoted to the dial rod. The advancing dial rod is pivoted to the base board such that the advancing dial rod meshes with the first tooth portion at the time when the advancing dial rod is exerted on by an external force, thereby actuating the wire hub seat to turn and advance. The withdrawing member comprises a locating ratchet pawl and a withdrawing dial rod, which are pivoted with the base board. The withdrawing dial rod has a locating tooth which meshes with the second tooth portion to locate the wire hub seat at the time when the withdrawing dial rod turns on the base board. The wire hub seat is acted on by the bias force to turn in reverse to withdraw.

9 Claims, 6 Drawing Sheets

DUAL DIAL ROD SPEED CHANGING INDICATOR

FIELD OF THE INVENTION

The present invention relates generally to a bicycle speed changer, and more particularly to a dual dial rod speed changing indicator.

BACKGROUND OF THE INVENTION

The conventional dual dial rod speed changing indicator has a base board which is provided with two ratchet wheels, an advancing dial rod, a withdrawing dial rod, and a plurality of ratchet pawls. The two ratchet wheels are coaxially mounted such that they are coupled with the advancing dial rod and the withdrawing dial rod by the ratchet pawls. In operation, the advancing dial rod is pushed to turn so as to actuate the two ratchet wheels to turn a predetermined angle to engage the pawls, thereby completing the bicycle speed changing. Similarly, the withdrawing dial rod is pushed to actuate the ratchet wheels to turn in reverse a predetermined angle so as to return to a gear position. In light of the two ratchet wheels being superimposed, the entire structure is rather complicated. The component parts must be assembled with precision to ensure that the gear shifting is located with certainty.

SUMMARY OF THE INVENTION

The present invention is to provide a dual dial rod speed changing indicator which is simple in construction to ensure that the gear shifting is attained with certainty.

The present invention comprises a base board, a wire hub seat, an advancing member, and a withdrawing member. The wire hub seat is pivoted to the base board and is acted on by a first bias force. The wire hub seat has a first ratchet tooth portion and a second ratchet tooth portion. The advancing member has an advancing dial rod and an advancing ratchet pawl. The advancing dial rod is acted on by a second bias force and is pivoted to the base board to turn between a first position and a second position. The advancing ratchet pawl is acted on by a third bias force and is pivoted to the advancing dial rod. When the advancing dial rod is exerted on by an external force to swivel from the first position to the second position, the advancing ratchet pawl is acted on by the third bias force to mesh with a tooth of the first ratchet tooth portion, thereby actuating the wire hub seat to overcome the first bias force to turn. When the external force is removed, the advancing dial rod is acted on by the second bias force to swivel from the second position to the first position. The withdrawing member comprises a locating ratchet pawl and a withdrawing dial rod. The locating ratchet pawl is acted on by a fourth bias force and is pivoted to the base board to engage a tooth of the second ratchet tooth portion for locating the wire hub seat. The withdrawing dial rod has a push block and a locating tooth, and is acted on by a fifth bias force and pivoted to the base board to swivel between a third position and a fourth position. When the withdrawing dial rod is acted on by an external force to turn from the third position to the fourth position, the push block presses against the locating ratchet pawl which is forced to move away from the second ratchet tooth portion. The locating tooth is meshed with a tooth of the second ratchet tooth portion. When the external force is removed, the withdrawing dial rod is acted on by the fifth bias force to swivel from the fourth position to the third position. The wire hub seat is acted on by the first bias force to turn in reverse. The locating ratchet pawl is acted on by the fourth bias force to mesh with the next tooth of the second ratchet tooth portion to locate the wire hub seat.

DETAILED DESCRIPTION OF THE INVENTION

Figure 1:
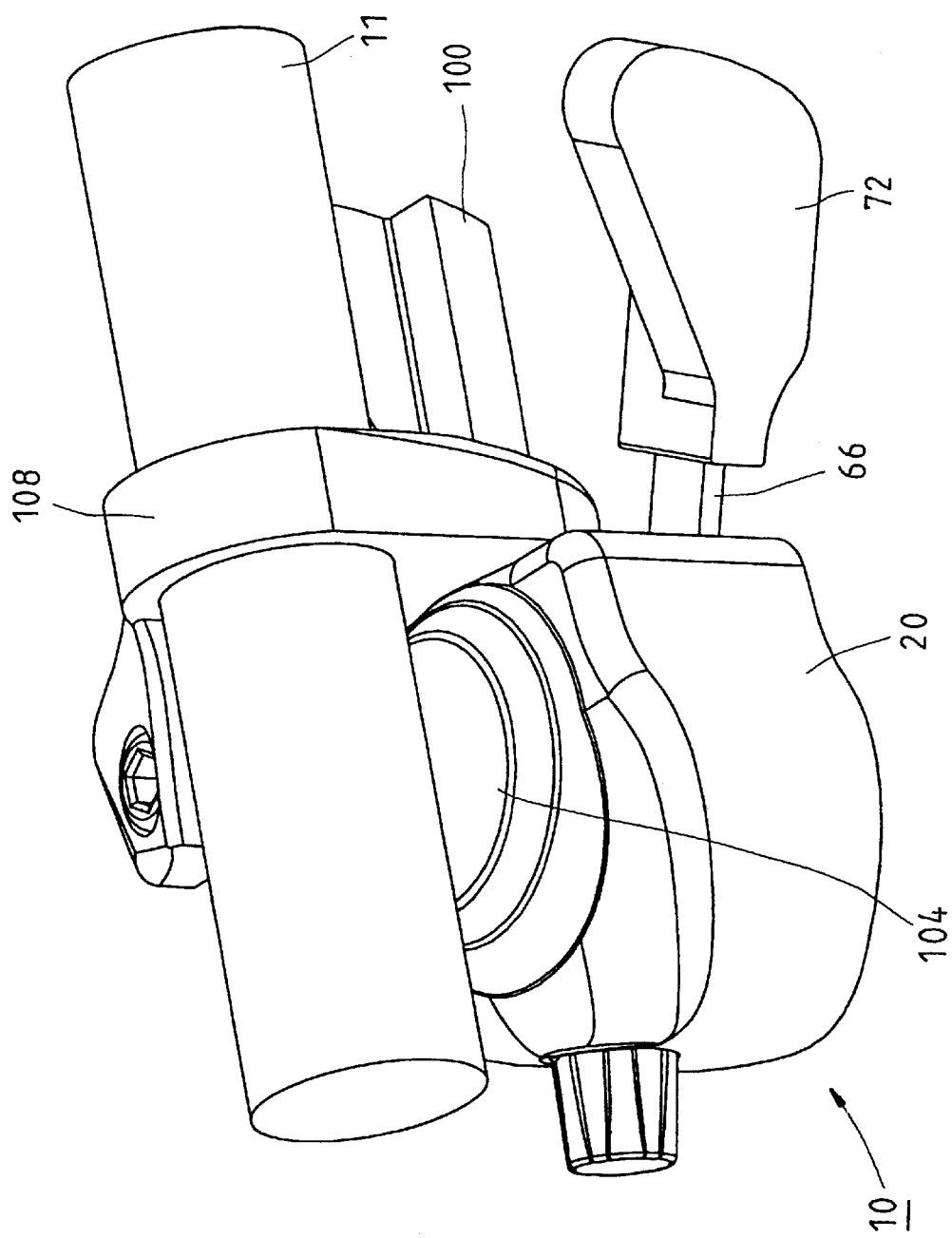
FIG. 1 shows a schematic view of the present invention in use.
Figure 2:
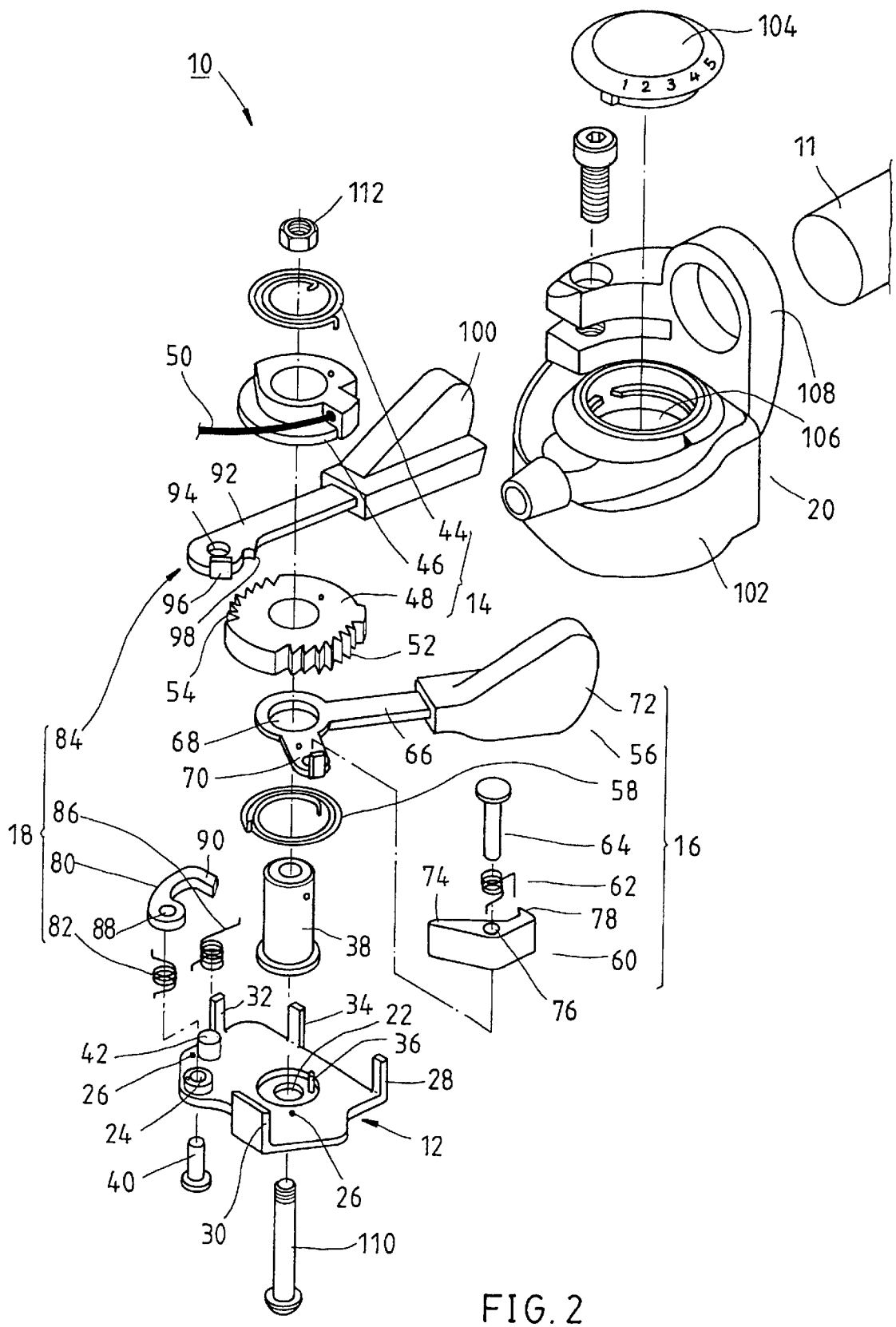
FIG. 2 shows an exploded view of the present invention.
Figure 3:
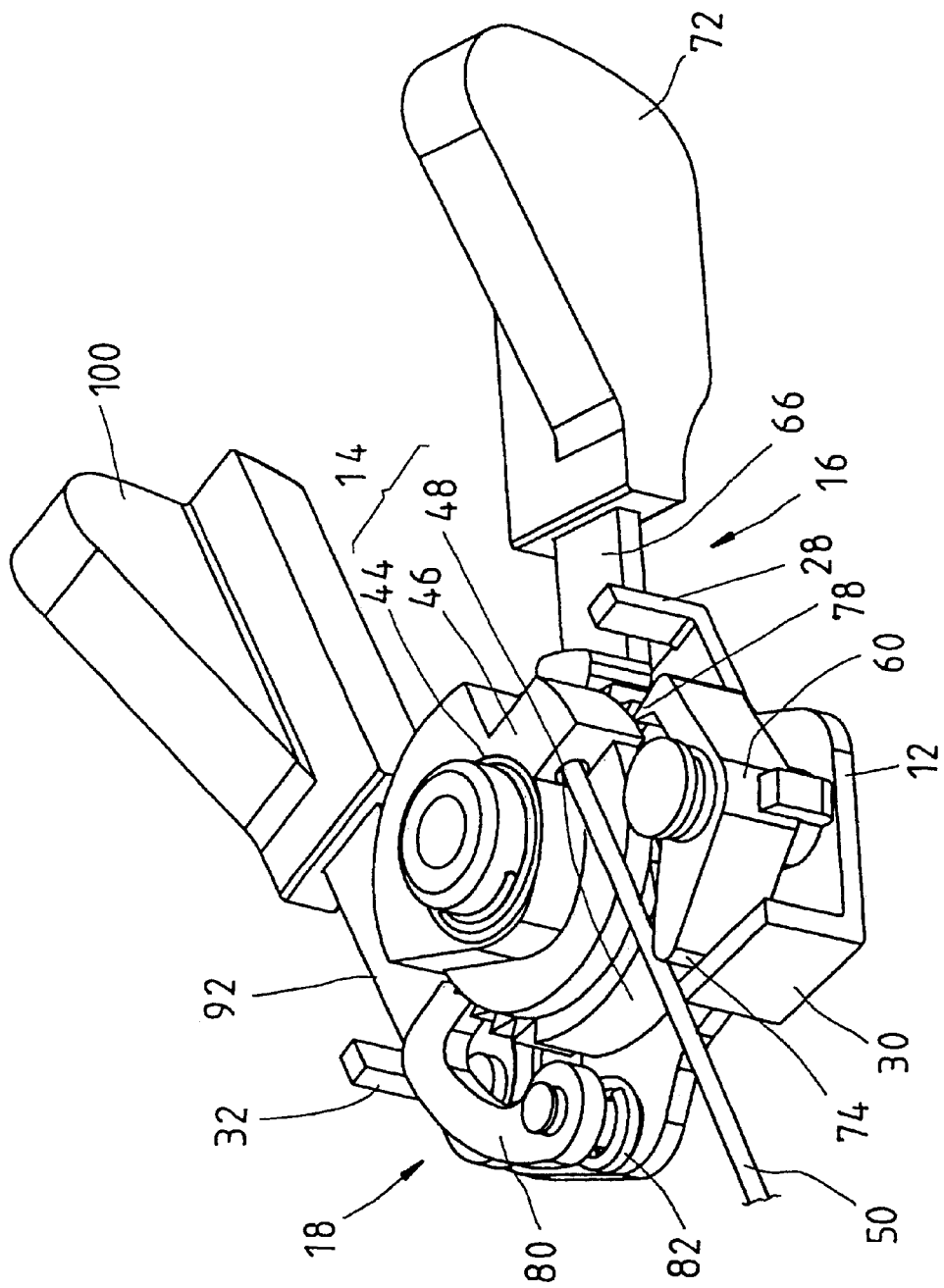
FIG. 3 shows a partial perspective view of the present invention in combination.
Figure 4:
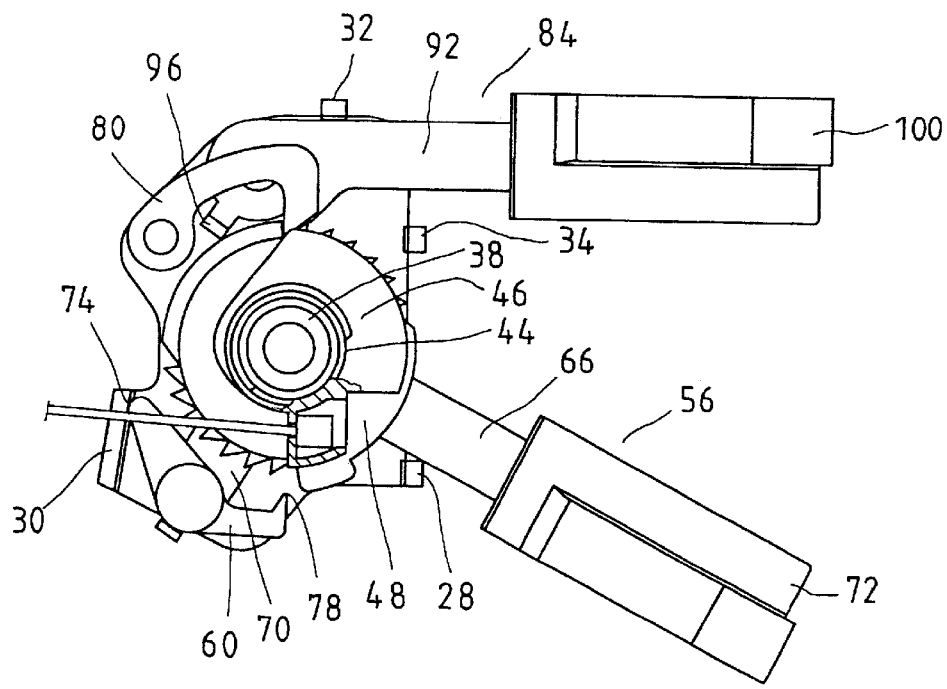
FIG. 4 shows a top view of FIG. 3.

As shown in FIGS. 1–4, a dual dial rod speed changing indicator 10 of the present invention is fixed on a bicycle handlebar 11 and is formed of a base board 12, a wire hub seat 14, an advancing member 16, a withdrawing member 18, and a cover 20.

The base board 12 has a first through hole 22, a second through hole 24, a plurality of locating holes 26, and a plurality of stop blocks 28, 30, 32 and 34, which are arranged at an interval around the periphery of the base board 12. The first through hole 22 is provided with a locating pin 36. The base board 12 is provided with a first pivot 38, a second pivot 40, and a third pivot 42.

The wire hub seat 14 comprises a first torsion spring 44, a wire receiving plate 46, and a ratchet wheel 48. The wire receiving plate 46 is fastened with one end of the guide wire 50 of a speed changer. The ratchet wheel 48 has a first ratchet tooth portion 52 and a second ratchet tooth portion 54, which are provided with a plurality of teeth. The wire receiving plate 46 and the ratchet wheel 48 are fastened by a pin (not shown in the drawing).

The advancing member 16 comprises an advancing dial rod 56, a second torsion spring 58, an advancing ratchet pawl 60, a third torsion spring 62, and a fourth pivot 64. The advancing dial rod 56 has an action plate 66, a pivoting hole 68, and a side plate 70. The action plate 66 is provided with an advancing contact piece 72. The advancing ratchet pawl 60 has a rest portion 74, a pivoting hole 76, and a pawl portion 78. The fourth pivot 64 is fastened with the side plate 70 such that the pivot 64 is put through the pivoting hole 76 of the advancing ratchet pawl 60 and the third torsion spring 62, so as to pivot the advancing ratchet pawl 60 with the advancing dial rod 56. Both ends of the spring 62 urge respectively the advancing ratchet pawl 60 and the side plate 70.

The withdrawing member 18 comprises a locating ratchet pawl 80, a fourth torsion spring 82, a withdrawing dial rod 84, and a fifth torsion spring 86. The locating ratchet pawl 80 has a pivoting hole 88 and a pawl portion 90. The withdrawing dial rod 84 has an action plate 92, a pivoting hole 94, a push block 96, and a locating tooth 98. The action plate is further provided with a withdrawing contact piece 100.

The cover 20 has a housing 102 and a gear indicating panel 104. The housing 102 is provided therein with a receiving cell 106 for disposing the components referred to above. The housing 102 is provided in one side with a lashing ring 108 for fixing the housing 102 on the bicycle handlebar 11. The panel 104 is pivoted in the housing 102 and is fastened with the wire receiving plate 46 by a pin (not shown in the drawing).

The second torsion spring 58, the advancing dial rod 56, the ratchet wheel 48, the wire receiving plate 46, and the first torsion spring 44 are sequentially mounted on the first pivot 38 and fastened with one end of the threaded rod 110 by a nut 112. The threaded rod 110 is put through the first pivoting center. Both ends of the first torsion spring 44 are connected with the first pivot 38 and the wire receiving plate 46 for providing the wire hub seat 14 with a clockwise first bias force. Both ends of the second torsion spring 58 are connected with the base board 12 and the advancing dial rod 56 for providing the advancing dial rod 56 with a clockwise second bias force. The third spring 62 provides the advancing ratchet pawl 60 with a counterclockwise third bias force.

The fourth torsion spring 82 and the locating ratchet pawl 80 are sequentially mounted on the second pivot 40. Both ends of the spring 82 are connected with the base board 12 and the locating ratchet pawl 80 for providing the locating ratchet pawl 80 with a clockwise fourth bias force. The fifth spring 86 and the withdrawing dial rod 84 are sequentially mounted on the third pivot 42. The spring 86 are connected at both ends with the base board 12 and the withdrawing dial rod 84 for providing the withdrawing dial rod 84 with a counterclockwise fifth bias force. The cover 20 is fastened with the base board 12, the speed changer guide wire 50, the panel 104, and the wire receiving plate 46.

Figure 5:
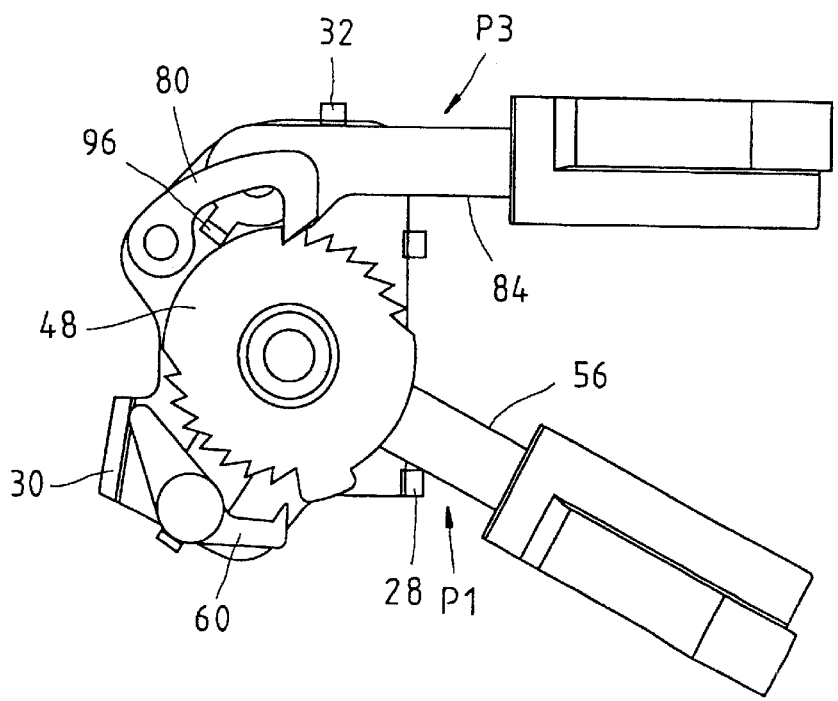
FIG. 5 shows a partial top view of the present invention to show the normal positions of the advancing and the withdrawing dial rods.

As shown in FIG. 5, under the normal circumstance, the advancing dial rod 56 presses against the first stop block 28, so as to locate at a first position (P1). The rest portion 74 of the advancing ratchet pawl 60 is rested on the second stop block 30, thereby forcing the pawl portion 78 of the advancing ratchet pawl 60 to move away from the first ratchet tooth portion 52. In the meantime, the locating ratchet pawl 80 is meshed with the second ratchet tooth portion 54 so as to locate the wire hub seat 14. The withdrawing dial rod 84 is rested on the fourth stop block 34 to locate as a third position (P3).

Figure 6:
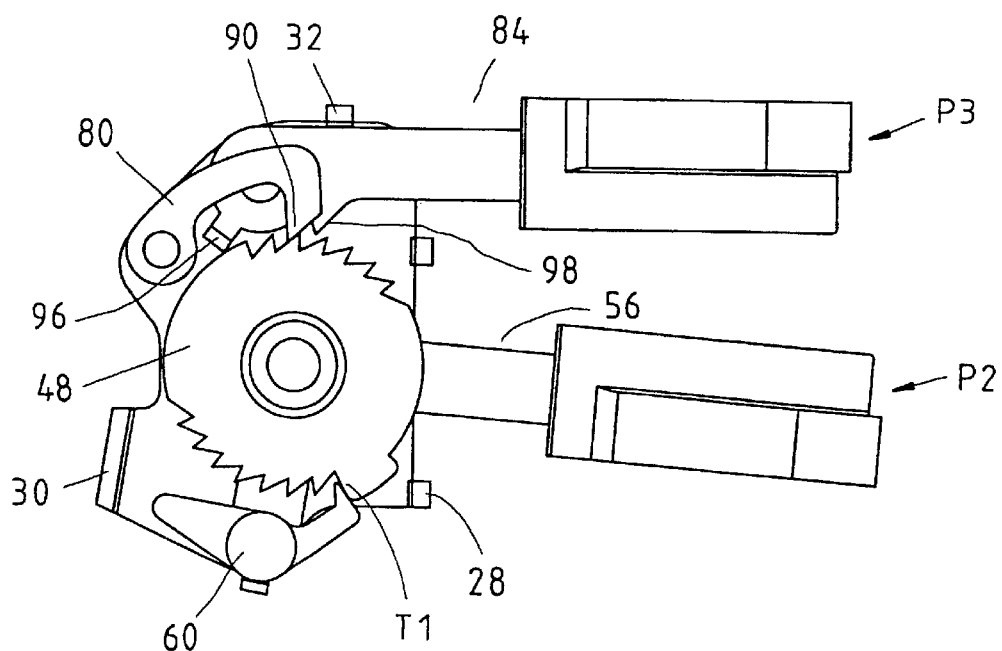
FIG. 6 is similar to FIG. 5 to show the advancing dial rod to be acted on by the external force to swivel from the first position to the second position.

As shown in FIG. 6, when the advancing dial rod 56 is exerted on by a counterclockwise external force to swivel from the first position (P1) to the second position (P2), the rest portion 74 of the advancing ratchet pawl 60 moves away from the second stop block 30 to engage a tooth (T1) of the first ratchet tooth portion 52 due to the third bias force. The wire hub seat 14 is so actuated as to over the first bias force to rotate.

Figure 7:
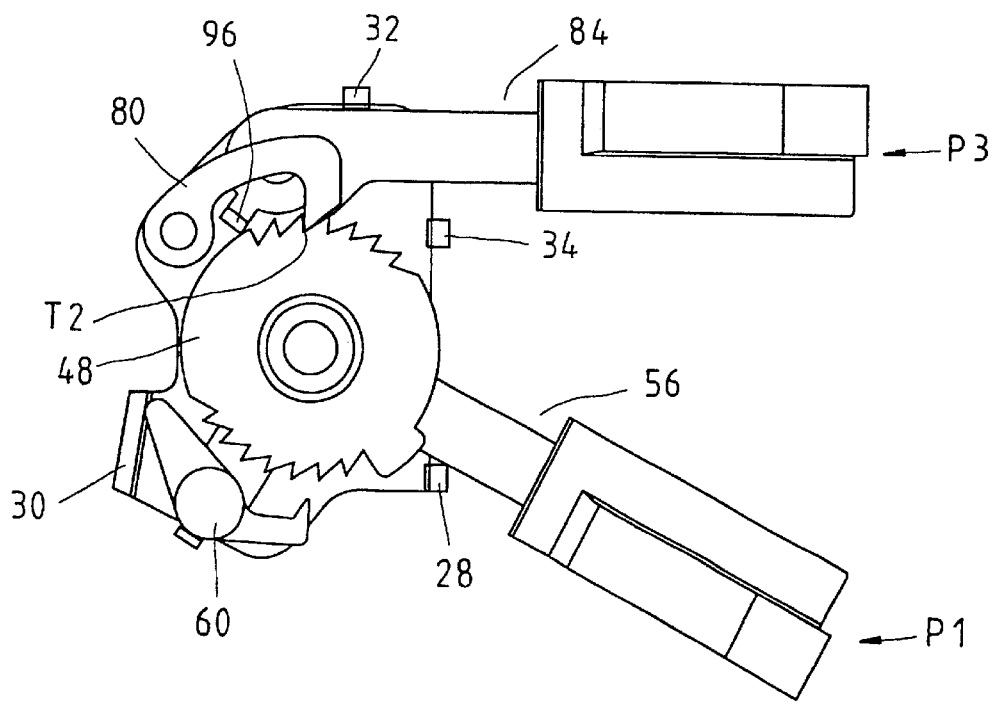
FIG. 7 is similar to FIG. 6 to show the advancing dial rod to return to the first position to complete the advancement.

As shown in FIG. 7, when the external force is removed, the advancing dial rod 56 is exerted on by the second bias force to swivel from the second position (P2) to the first position (P1). In the meantime, the locating ratchet pawl 80 is engaged with a tooth (T2) of the second ratchet tooth portion 54 so as to relocate the wire hub seat 14, thereby attaining the gear shifting.

Figure 8:
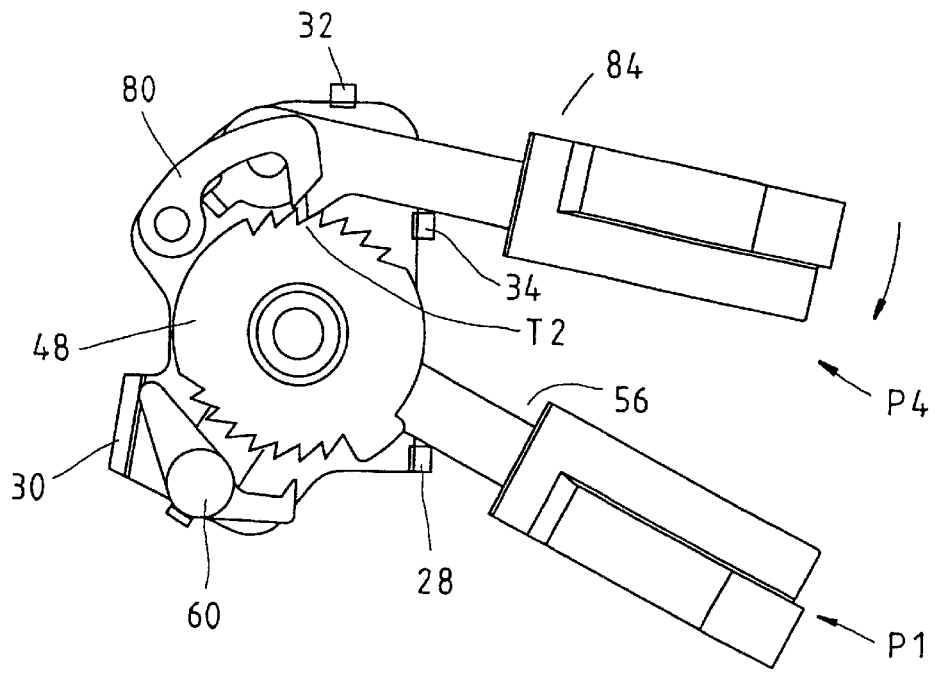
FIG. 8 shows a partial top view of the present invention to show the withdrawing dial rod to be exerted on by the external force to turn from the third position to the fourth position.
Figure 9:
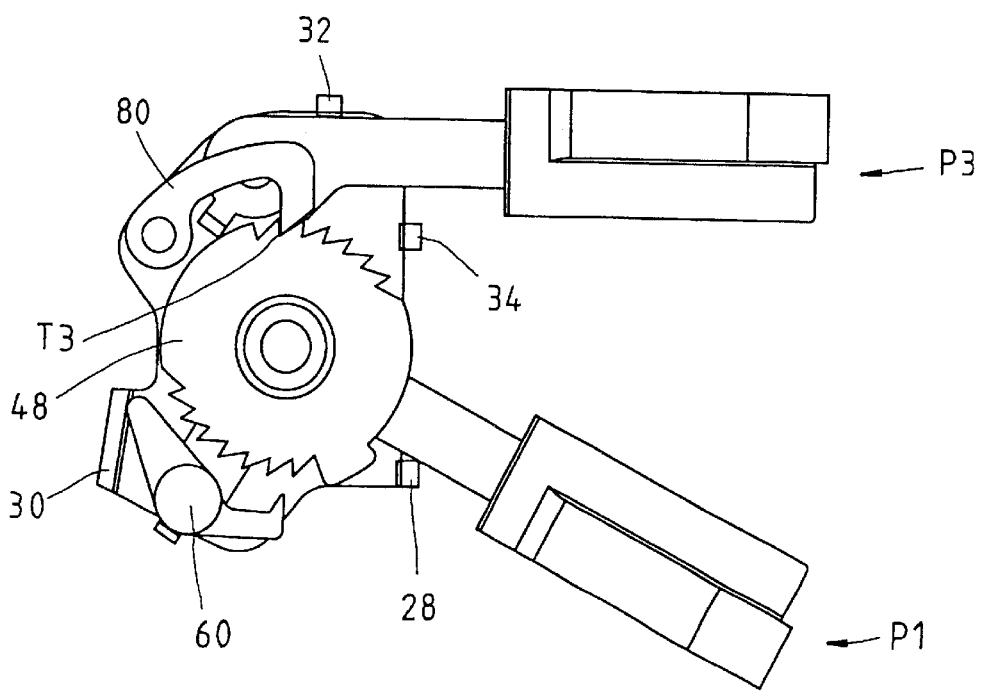
FIG. 9 is similar to FIG. 8 to show that the withdrawing dial rod returns to the third position to complete the withdrawal.

As shown in FIG. 8, the withdrawing dial rod 84 is exerted on by an external force to swivel from the third position (P3) to the fourth position (P4), the push block 96 presses against the locating ratchet pawl 80, which is forced to move away from the tooth (T2) of the second ratchet tooth portion 54. The locating tooth 98 is engaged with the tooth (T2) of the second ratchet tooth portion 54. As shown in FIG. 9, when the external force is removed, the withdrawing dial rod 84 is exerted on by the fifth bias force to swivel from the fourth position (P4) to the third position (P3). The wire hub seat 14 is acted on by the first bias force to turn in reverse. The locating ratchet pawl 80 is acted on by the fourth bias force to mesh again with the tooth (T3) of the second ratchet tooth portion 54 to locate the wire hub seat 14, thereby resulting in the gear withdrawal.

What is claimed is:

1. A dual dial rod speed changing indicator comprising:
   a base board;
   a wire hub seat acted on by a first bias force and pivoted to said base board, said wire hub seat having a first ratchet tooth portion and a second ratchet tooth portion, which are provided with a plurality of teeth;
   an advancing member comprising an advancing dial rod and an advancing ratchet pawl, said advancing dial rod being acted on by a second bias force and pivoted to said base board to swivel between a first position and a second position, said advancing ratchet pawl being acted on by a third bias force and pivoted to said advancing dial rod, said advancing dial rod being forced by an external force to swivel from the first position to the second position, said advancing ratchet pawl being acted on by the third bias force to mesh with a tooth of said first ratchet tooth portion so as to actuate said wire hub seat to overcome the first bias force to turn, said advancing dial rod being acted on by the second bias force to swivel from the second position to the first position at the time when the external force is removed;
   a withdrawing member comprising a locating ratchet pawl and a withdrawing dial rod, said locating ratchet pawl being acted on by a fourth bias force and pivoted to said base board to mesh with a tooth of said second ratchet tooth portion for locating said wire hub seat, said withdrawing dial rod having a push block and a locating tooth, said withdrawing dial rod being acted on by a fifth bias force and pivoted to said base board to swivel from a first position to a fourth position, said withdrawing dial rod being acted on by another external force to swivel from the third position to the fourth position, said push block resting on said locating ratchet pawl to force said locating ratchet pawl to move away from said second ratchet tooth portion, said locating tooth urging a tooth of said second ratchet tooth portion, said withdrawing dial rod being acted on by the fifth bias force to swivel from the fourth position to the third position at the time when the external force is removed, said wire hub seat being acted on by the first bias force to turn in reverse to withdraw, said locating ratchet pawl being acted on by the fourth bias force to mesh again with a tooth of said second ratchet tooth portion to locate said wire hub seat.

2. The indicator as defined in claim 1, wherein said base board is provided with a first pivot for pivoting said wire hub seat, said first pivot and said wire hub seat being provided therebetween with a first torsion spring for providing the first bias force.

3. The indicator as defined in claim 2, wherein said advancing dial rod is pivoted by said first pivot and located between said wire hub seat and said base board, said base board and said advancing dial rod being provided therebetween with a second torsion spring for providing the second bias force.

4. The indicator as defined in claim 3, wherein said base board has a first stop block pressing against said advancing dial rod to locate at the first position at the time when said advancing dial rod is in a normal state.

5. The indicator as defined in claim 3, wherein said advancing dial rod has a side plate, said advancing ratchet pawl being pivoted to said side plate to locate at a peripheral edge of said first ratchet tooth portion, said advancing dial rod and said advancing ratchet pawl being provided therebetween with a third torsion spring for providing the third bias force.

6. The indicator as defined in claim 5, wherein said base board has a second stop block; wherein said advancing ratchet pawl has a rest portion and a pawl portion which is engaged with said first tooth portion, said rest portion of said advancing ratchet pawl pressing against said second stop block at the time when said advancing dial rod is located at the first position, thereby forcing said advancing ratchet pawl to swivel in relation to said advancing dial rod such that said pawl portion moves away from the engaging tooth of said first tooth portion.

7. The indicator as defined in claim 1, wherein said base board is provided with a second pivot for pivoting said locating ratchet pawl, said second pivot and said locating ratchet pawl being provided therebetween with a fourth torsion spring for providing the fourth bias force.

8. The indicator as defined in claim 1, wherein said base board is provided with a third pivot for pivoting said withdrawing dial rod, said base board and said withdrawing dial rod being provided with a fifth torsion spring for providing the fifth bias force.

9. The indicator as defined in claim 8, wherein said base board has a third stop block pressing against said withdrawing dial rod to locate at the third position at the time when said withdrawing dial rod is in a normal state.

* * * * *